(12) United States Patent
Garrett et al.

(10) Patent No.: US 12,307,863 B2
(45) Date of Patent: May 20, 2025

(54) PLATE STABILITY FOR A DEPOSIT AND DISPENSE MODULE

(71) Applicant: NCR Atleos Corporation, Atlanta, GA (US)

(72) Inventors: Jamie Luke Garrett, Perth (GB); Jamie Stewart, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/228,270

(22) Filed: Jul. 31, 2023

(65) Prior Publication Data

US 2025/0046159 A1 Feb. 6, 2025

(51) Int. Cl.
*G07F 19/00* (2006.01)
*F16C 35/063* (2006.01)

(52) U.S. Cl.
CPC .......... *G07F 19/205* (2013.01); *F16C 35/063* (2013.01); *G07F 19/202* (2013.01); *G07F 19/203* (2013.01)

(58) Field of Classification Search
CPC .... G07F 19/205; G07F 19/202; F16C 35/063; G06F 19/203
See application file for complete search history.

(56) References Cited

U.S. PATENT DOCUMENTS

| | | | |
|---|---|---|---|
| 2,989,307 A | 6/1961 | Weidenhammer | |
| 5,899,448 A | 5/1999 | Hosking | |
| 6,296,243 B1 | 10/2001 | Nishimura | |
| 6,393,334 B1 * | 5/2002 | Lewis | H01L 21/67772 700/121 |
| 11,113,920 B2 | 9/2021 | Qu et al. | |
| 2014/0260120 A1 | 9/2014 | Okamoto | |

* cited by examiner

*Primary Examiner* — Matthew Mikels
(74) *Attorney, Agent, or Firm* — Schwegman Lundberg & Woessner, P.A.

(57) ABSTRACT

A plate stability apparatus includes plates and vertical members to handle media being dispensed, deposited, and/or rejected. The plates lock into the vertical members when the plates reach a desired vertical position for a given media operation within a media separator of a deposit and dispense module. This prevents the plates from tilting and moving while the plates remain level for the media operation. This in turn prevents device faults and media jams within the deposit and dispense module during the media operation.

15 Claims, 14 Drawing Sheets

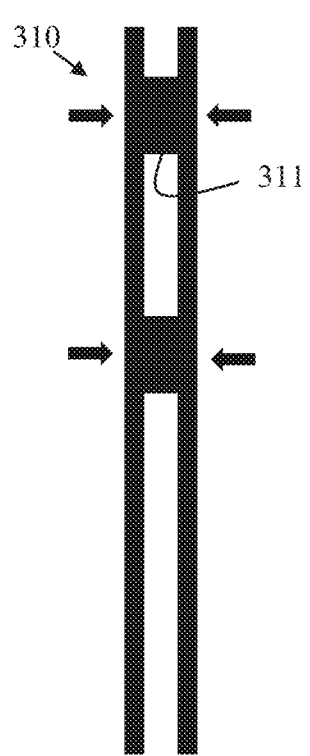 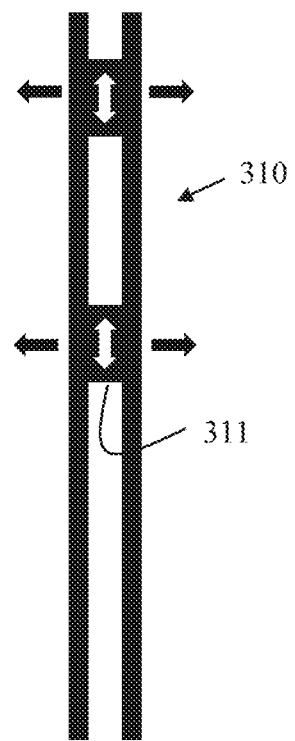
FIG. 3B
FIG. 3C

PLATE STABILITY FOR A DEPOSIT AND DISPENSE MODULE

BACKGROUND

Media handling devices have a variety of different modules one of which is a deposit and dispense module. This module includes, among other things, plates that are urged together or apart for purposes of handling deposited notes and dispensing media notes. The plates are known to have unwanted tilt, which has a negative impact on positioning of the plates. The incorrect positioning of the plates can cause notes to stack poorly and the adjacent wall mechanism to jam on the plates as it extends; both of which result in a device fault.

Tilt in the plates is caused by the plate mechanisms being driven by a single point. This causes the plates to pivot around the single point. While there are guides at the four corners of the plates, the tolerance between the guides and the plates results in gaps causing the plates to pivot or tilt.

SUMMARY

In various embodiments, plate stability apparatuses, a media separator of a deposit and dispense module, and a method of operating the media separator are presented. A plate stability apparatus includes plates to handle media being dispensed, deposited, and/or rejected. The plates receive the media, maintain pressure on the media while moving the media, and move the media within a media separator module to predefined vertical positions necessary for a media operation to complete. The plate stability apparatus ensures that each plate remains level, does not tilt, and reduces tolerances of plate movement during the media operation.

In an embodiment, the plate stability apparatus includes the plates, threaded shafts (may also be referred to as "vertical members" herein and below), and threaded bearings, the threaded bearings affixed to four corners of each plate and are adapted to screw and unscrew on the shafts to stably move the plates to desired vertical positions within the media separator for the media operation.

In an embodiment, the plate stability apparatus includes the plates, rails and plate bearings. Each plate bearing extends as an arm and is attached to an area adjacent to a corner of a given plate. Sidewalls of the vertical rails pinch and prevent the plate bearings from moving once a desired vertical position for the media operation is obtained for a given plate. In an embodiment, the sidewalls of the vertical rails include clamp brakes to pinch the sidewalls against the plate bearings to lock the plate bearings at a desired vertical position for the media operation. The clamp brakes release the pinches to permit the plate to move to a desired vertical position during the media operation. In an embodiment, the sidewalls include electromagnets that activate and hold metal-based plate bearings in a desired vertical position along the vertical rails and the electromagnets deactivate to permit the metal-based plate bearings to move a given plate to another desired vertical position along the rail during the media operation.

In an embodiment, the plate stability apparatus includes the plated, rails with toothed elements, and geared elements. Each geared element extends as an arm adjacent to corners of a given plate. The geared elements rotate up and down the toothed elements of the rails to move the corresponding plates vertically up and down to desired positions during the media operation. When the geared elements are not rotated, they lock into a corresponding pair of toothed elements in sidewalls of the rails prevent movement of the corresponding plates.

BRIEF DESCRIPTION OF THE DRAWINGS

FIGS. 3B and 3C are diagrams illustrating rail guides and a clamp/brake and release within the rail guides for a plate stability apparatus, according to an example embodiment.

DETAILED DESCRIPTION

Typically, a deposit and dispense module includes four plates that are moved together and separated for purposes of handling media notes being deposited, dispensed, and/or rejected during a media operation at a transaction terminal. These plates are attached in their four corners to shafts via pins in the corners, the pins of the plates slide into guides located on the shafts. Unfortunately, the pin and shaft guide approach results in unacceptable movement tolerances in the plates, causing the plates to tilt and become unlevel resulting in media jams and module faults.

The techniques presented herein and below resolve these issues by providing a plurality of plate stability apparatuses integrated into a deposit and dispense module to ensure the plates are level without any tilting when the plates are moved to handle media during a media operation at a transaction terminal. Several plate stability apparatuses are discussed, each of which provide plate stability for the plates of a deposit and dispense module during media operations processed on a transaction terminal.

The terms "media," "media item," "banknotes," "notes," "currency," "checks," and/or "cash" are used synonymously and interchangeably herein and below. These terms refer to the media being transported to, from, and within a deposit and dispense module during a media operation being processed on a transaction terminal.

In an embodiment, the "media operations" include depositing a single note, depositing a bunch of notes, depositing a single check, depositing a bunch of checks, depositing a mixture of notes and checks within a single bunch, dispensing currency, and/or rejecting one or a plurality of media items during a deposit media operation.

In an embodiment, the transaction terminal is an automated teller machine (ATM). In an embodiment, the transaction terminal is a point-of-sale (POS) terminal operated by a cashier or a teller during a media operation. In an embodiment, the transaction terminal is a self-service terminal (SST) with a consumer performing a self-service media operation; for example, a self-service checkout at a retail or grocery store. The SST includes a deposit and dispense module to receive/deposit notes and to dispense notes for purposes of receiving payment and providing change to the consumer for a self-service transaction.

Figure 1A:
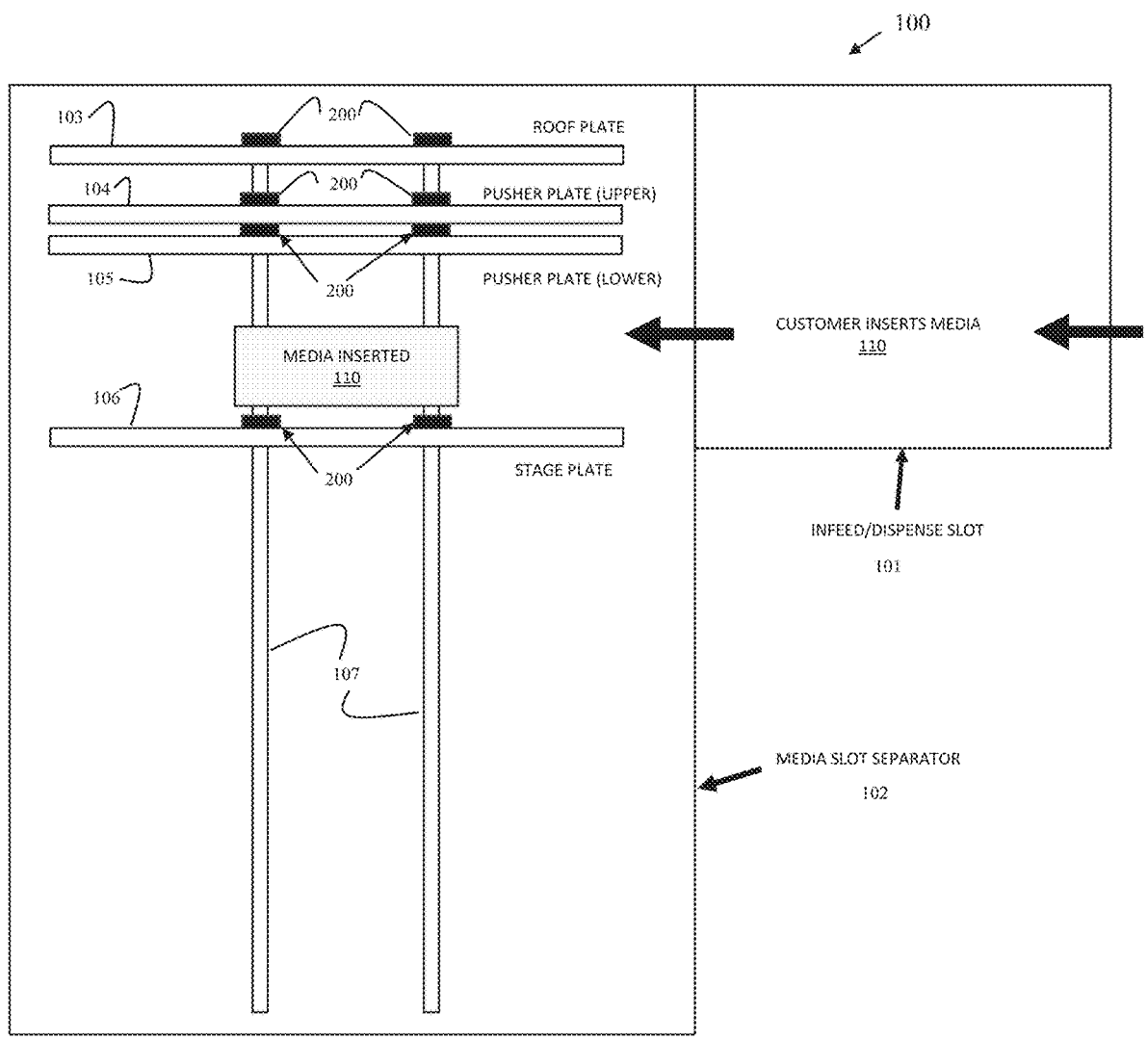
FIG. 1A is a diagram of a deposit and dispense module with a plate stability apparatus during a media deposit operation at a transaction terminal, according to an example embodiment.

FIG. 1A is a diagram of a deposit and dispense module 100 with a plate stability apparatus during a media deposit operation at a transaction terminal, according to an example embodiment. The plate stability apparatus includes two to four shafts 107 (FIG. 1A is a side view of deposit and dispense module with two shafts 107 visible), a roof plate 103, an upper pusher plate 104, a lower pusher plate 105, a stage plate 106, and a plurality of treaded bearings 200. Each threaded bearing 200 attached to both a corresponding shaft 107 and plate (103, 104, 105, or 106).

Threaded bearings 200 adapted to screw onto the corresponding shafts 107. Each plate (103, 104, 105, or 106) includes an aperture through which a corresponding shaft 107 fits through. The aperture includes a flange corresponding to a bearing 200, such that the bearing 200 is attached to and firmly fits within the aperture. Each bearing 200 includes an inner race and an outer race, the outer race remains snuggly within the aperture of and affixed to a portion of a corresponding plate (103, 104, 105, or 106). The outer race does not rotate while the inner race rotates to move up and down a given shaft 107. Each plate (103, 104, 105, or 106) is lowered and screwed onto the corresponding shaft 107 via a corresponding threaded bearing 200 and positioned in an idle state for the deposit and dispense module 100 and/or the transaction terminal within which the deposit and dispense module 100 is interfaced and integrated as a peripheral device of the transaction terminal.

FIG. 1A illustrates a deposit and dispense module 100 in a media inserted state, which means that a customer has inserted media 110 into an infeed/dispense slot 101 of the deposit and dispense module 100. A controller of the deposit and dispense module 100 activates electromechanical components of the plate stability apparatus and the deposit and dispense module 100 to urge the plates (103, 104, 105, and 106) into the positions along the shafts 107 as illustrated in FIG. 1A. This causes the inner race of each threaded bearing 200 to rotate in the necessary direction to urge the corresponding plates (103, 104, 105, or 106) into vertical positions. A force exerted downward on a given plate (103, 104, 105, or 106) causes the corresponding inner races of the threaded bearings 200 to rotate counterclockwise and move the plate (103, 104, 105, or 106) downward along the vertical shafts 107. A force exerted upward on a given plate (103, 104, 105, or 106) causes the corresponding inner races of the threaded bearings 200 to rotate clockwise and move the plate (103, 104, 105, or 106) upward along the vertical shafts 107.

The controller uses sensor data provided to sensors to evaluate and ensure that the plates (103, 104, 105, and 106) are in the proper position for a given state. The controller activates motors, pulleys, and/or gears to exert the force upward or downward on the plates (103, 104, 105, and 106) individually, in combination, and/or collectively.

The threaded bearings 200 provide stability to each plate (103, 104, 105, and 106) ensuring that the plates (103, 104, 105, and 106) do not tilt and remain level during movement into their proper positions along the shafts 107 needed for the corresponding state.

The plate stability apparatus resides within a media slot separator 102 of the deposit and dispense module 100 adjacent to and interfaced to the infeed/dispense slot and interfaced to other modules of the deposit and dispense module 100. The media slot separator 102 is further interfaced to additional media modules of a media recycler, such as an escrow module, a lower transport module, and upper transport module, and/or media cassette modules.

During initial setup and configuration, the plates (103, 104, 105, and 106) are lowered along four corners via the corresponding threaded bearings 200 to engage four threaded shafts 107. This ensures that each plate (103, 104, 105, and 106) remains level and ensures that little to no tolerance in movement of the plates (103, 104, 105, and 106) is capable once each plate (103, 104, 105, and 106) are fully engaged on the shafts 107 via the threaded apertures of the threaded bearings 200. With the tolerance of movement virtually eliminated for the plates (103, 104, 105, and 106) and with the plates (103, 104, 105, and 106) remaining level at all times, the proper pressure exerted on the notes by any two plates (103, 104, 105, and/or 106) can be maintained and monitored. This reduces the likelihood of device faults caused from tilting and adjacent wall mechanism faults. With the faults reduced, the transaction terminal availability increases because service calls to address the faults are no longer needed. Additionally, less service calls and faults can decrease the rate and number of slot separator 102 requiring replacement and/or decrease the rate and number of deposit and dispense module 100 requiring replacement in the field due to damage.

FIG. 1A illustrates a media deposit state for the media slot separator 102, the deposit and dispense module 100, and the plate stability apparatus after media is inserted 110 onto stage plate 106. The controller controls the plate stability apparatus to move to a next state as illustrated in FIG. 1B.

Figure 1B:
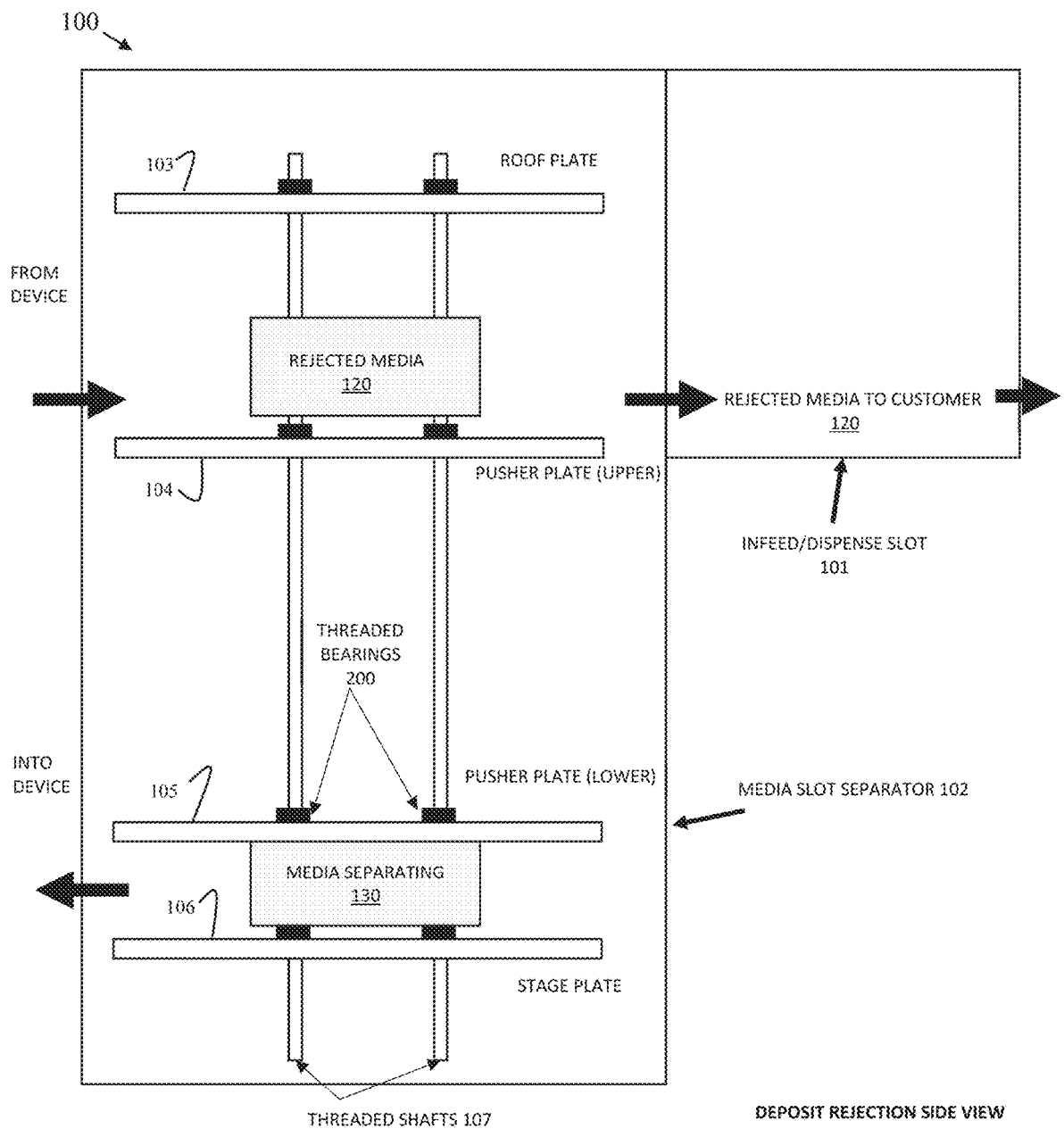
FIG. 1B is a diagram of a deposit and dispense module with a plate stability apparatus during a rejected media operation at a transaction terminal for which rejected media is returned to a customer, according to an example embodiment.

FIG. 1B is a diagram of a deposit and dispense module 100 with a plate stability apparatus during a rejected media operation at a transaction terminal for which rejected media 120 is returned to a customer, according to an example embodiment. Again, FIG. 1B illustrates a side view of the deposit and dispense module 100 and the media slot separator 102.

The controller moves or urges the lower pusher plate 105 down along threaded shafts 107 from the position illustrated in FIG. 1A onto a top surface of the media bunch (hereinafter just "bunch") inserted 110. Simultaneously, the controller maintains stage plate 106 level and stabilized creating a desired pressure on the bunch from the lower pusher plate 105 pushing down on the top surface of the bunch and the stage plate 106 resisting and causing an upward force on the bottom surface of the bunch. The controller then simultaneously moves both the lower pusher plate 105 and the stage plate 106 downward along the shafts 107 together and in unison to a position needed to pick the notes from the bunch or eject the notes onto a transport module or another module for media verification or authentication for note identification. Once, the proper position along the shafts 107 for the media separation 130 of the bunch is achieved (shown as "into device" in FIG. 1B), the note denominations in the bunch are identified and authenticated, any checks are identified and authenticated, and any rejected media items are identified by other modules.

In an embodiment, which is illustrated in FIG. 1B, some of the media items in the original bunch can be rejected because a media item is damaged, counterfeit, an incorrect government currency handled by the deposit and dispense module 100, and/or an invalid check that cannot be deposited was identified. These media items are identified as rejected media 120 in FIG. 1B. The rejected media 120 is received from another module into the media slot separator 102 illustrated as "from device" in FIG. 1B. The controller moves the upper pusher plate 104 into the position along the shafts 107 to receive the rejected media 120 where the rejected media 120 is returned to the customer through the infeed/dispense slot 101.

Figure 1C:
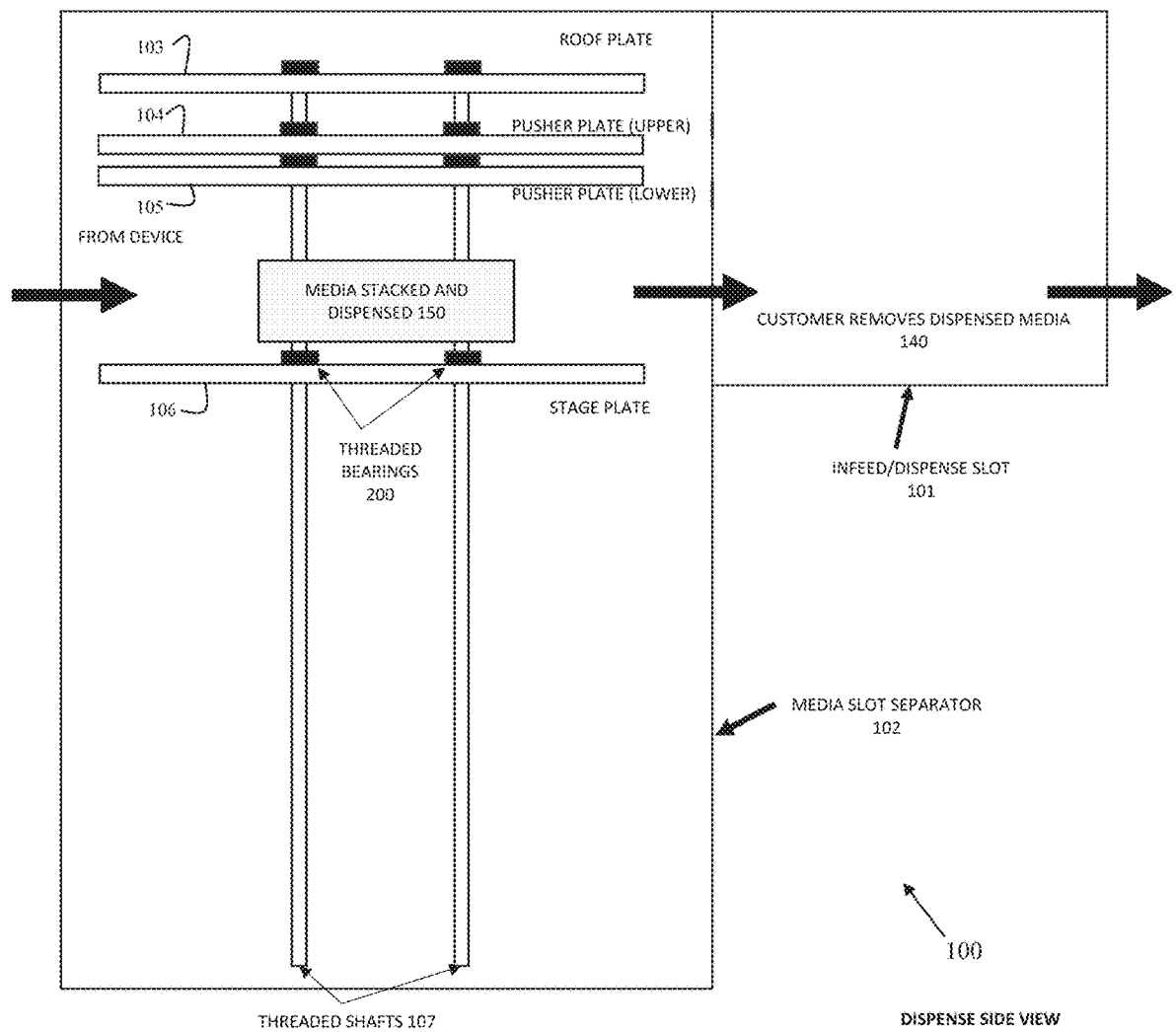
FIG. 1C is a diagram of a deposit and dispense module with a plate stability apparatus during a dispense media operation at a transaction terminal for which media is provided to a customer, according to an example embodiment.

FIG. 1C is a diagram of a deposit and dispense module 100 with a plate stability apparatus during a dispense media operation at a transaction terminal for which media is provided to a customer, according to an example embodiment. Once more FIG. 1C illustrates a side view of the deposit and dispense module 100 and the media slot separator 102.

During a dispense operation, media being dispensed is received from other modules as illustrated in FIG. 1C as "from device." The controller moves stage plate 106 along the shafts 107 into a needed vertical position along the shafts 107 to receive media stacked for dispensing 150. The media 150 is then dispensed through the infeed/dispense slot 101 and the customer removes the dispensed media 140.

Figure 1D:
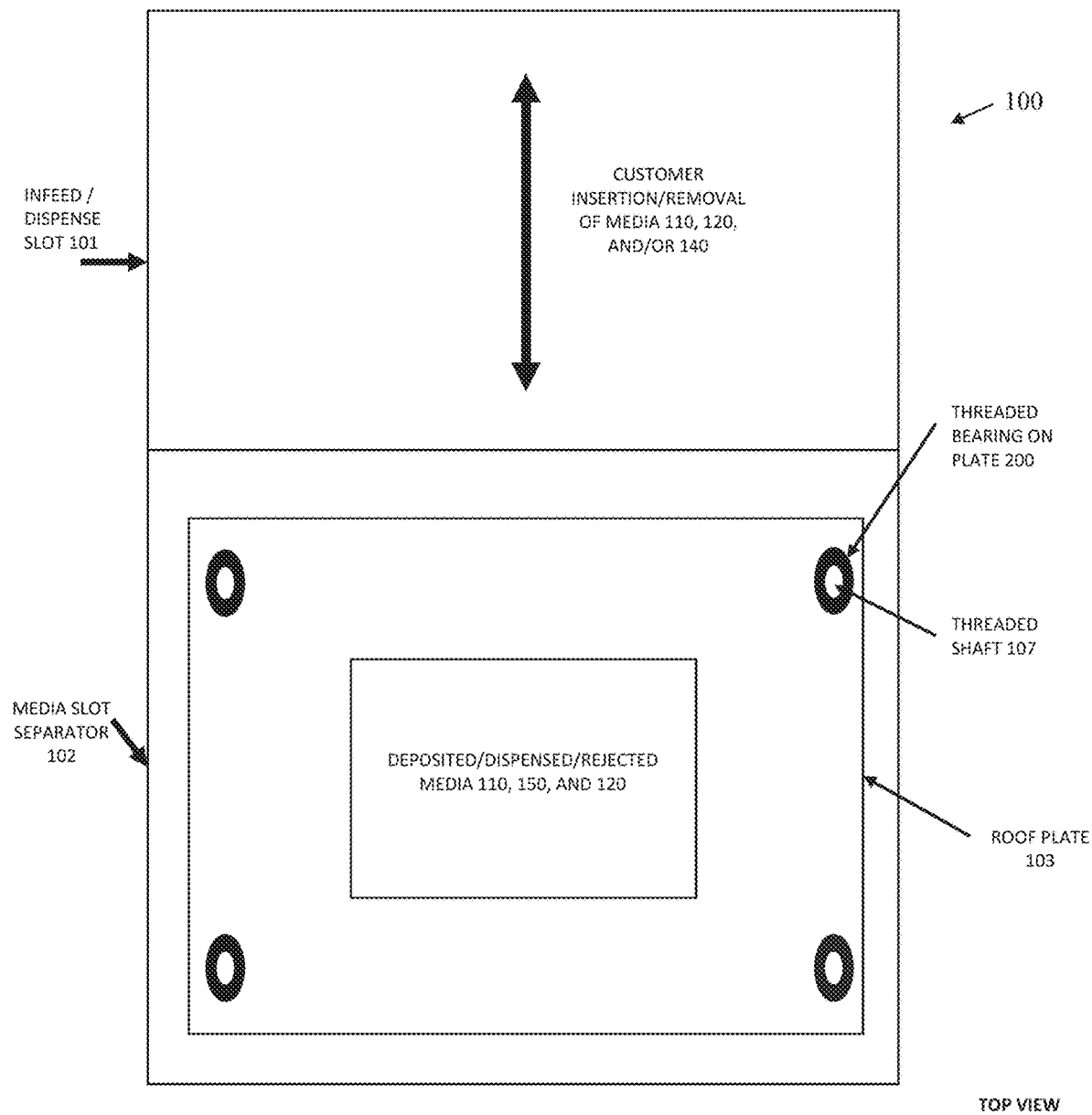
FIG. 1D is a diagram of a top-down view of the deposit and dispense module with a plate stability apparatus, according to an example embodiment.

FIG. 1D is a diagram of a top-down view of the deposit and dispense module 100 with a plate stability apparatus, according to an example embodiment. A top surface of the roof plate 103 is visible along with four threaded bearings 200 integrated into the four corners of the roof plate 103.

Underneath a bottom surface of the roof plate 103 is a top surface of any rejected 120 when a media rejected state is encountered as shown in FIG. 1B. Alternatively, underneath a bottom surface of the roof plate is a top surface of upper pusher plate 104 when the state is associated with media inserted 110 and/or media stacked for dispensing 150.

Each threaded bearing 200 is affixed to the roof plate 103 and is adjacent to a corner of the roof plate 103. Threaded apertures or holes in the bearings 200 screw onto the shafts 107. A clockwise screwing of the inner races of the bearings 200 causes a corresponding plate (103, 104, 105, or 106) to move downward along the shafts 107. A counterclockwise screwing of the inner races of the bearings causes a corresponding plate (103, 104, 105, or 106) to move upward along the shafts 107. The controller monitors and controls a position of each plate (103, 104, 105, and 106) along the shafts 107 based on a state of the deposit and dispense module 100 and/or the media slot separator 102. The controller also monitors and controls a pressure exerted by any two corresponding plates (103, 104, 105, and/or 106) when media is being moved upward or downward along the shafts 107. Media inserted or removed by the customer 110, 120, and/or 140 is received by the customer through the infeed/dispense slot.

Figure 2A:
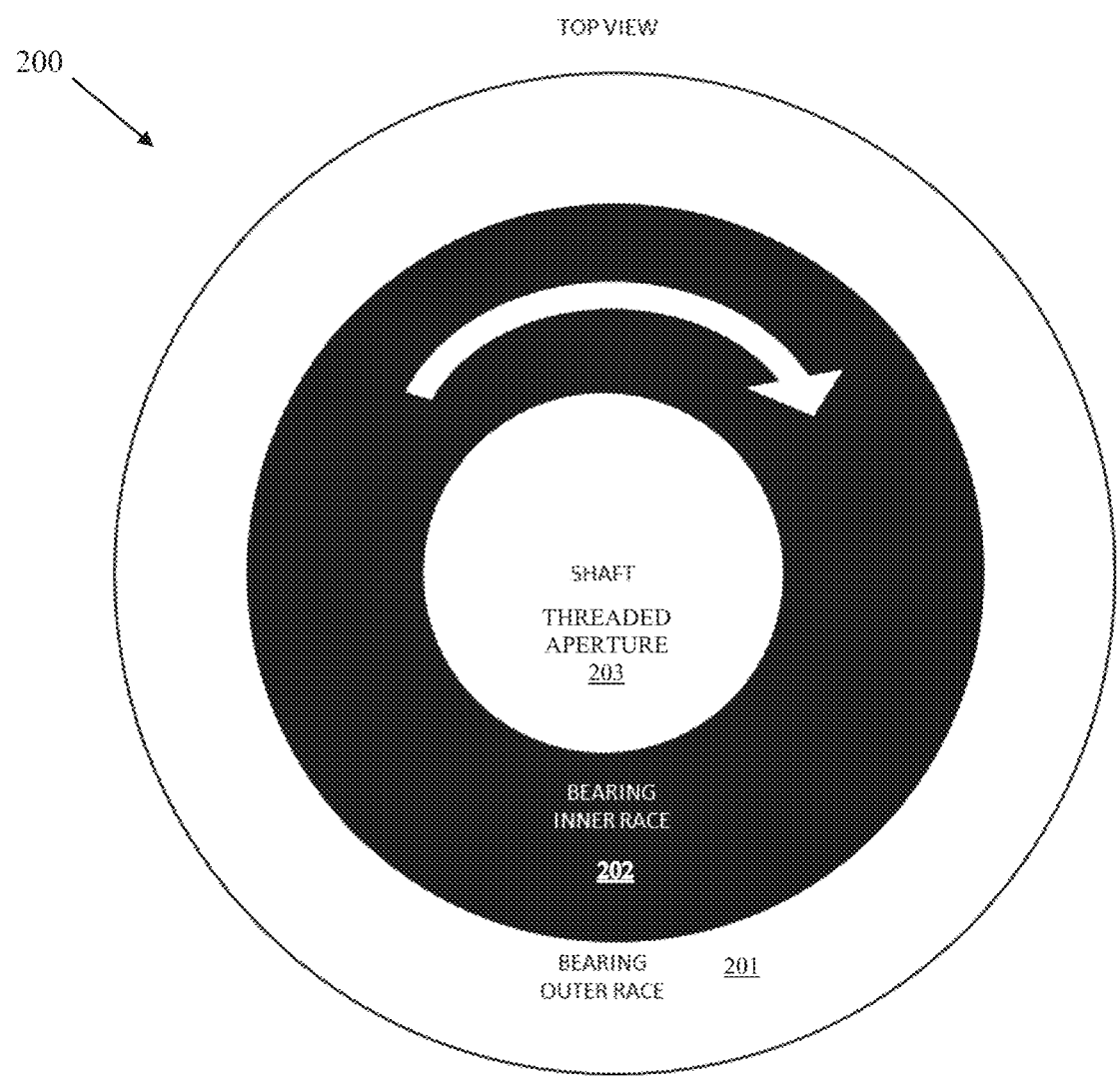
FIG. 2A is a diagram of a threaded bearing for a plate stability apparatus, according to an example embodiment.

FIG. 2A is a diagram of a threaded bearing 200 for a plate stability apparatus, according to an example embodiment. Again, the plate stability apparatus includes plates (103, 104, 105, and 106), shafts 107, and threaded bearings 200. Each plate (103, 104, 105, or 106) includes four threaded bearings 200.

Each threaded bearing 200 includes an outer race 201, an inner face 202, and a threaded aperture/hole 203. Each bearing 200 is adapted to snuggly screw along the threaded shafts 107 through the corresponding aperture 203. Clockwise screwing, as illustrated by the arrow in FIG. 2A, will lower the bearing 200 downward along the corresponding shaft 107. While counterclockwise unscrewing (not show in FIG. 2A) will raise the bearing upward along the threaded shaft 107. That is, each threaded bearing 200 can be screwed onto a corresponding shaft 107 from an initial vertical position to a lower vertical position along the shaft 107. Each threaded bearing 200 can also be unscrewed from a corresponding shaft 107 from an initial vertical position to a higher vertical position along the shaft 107.

Figure 2B:
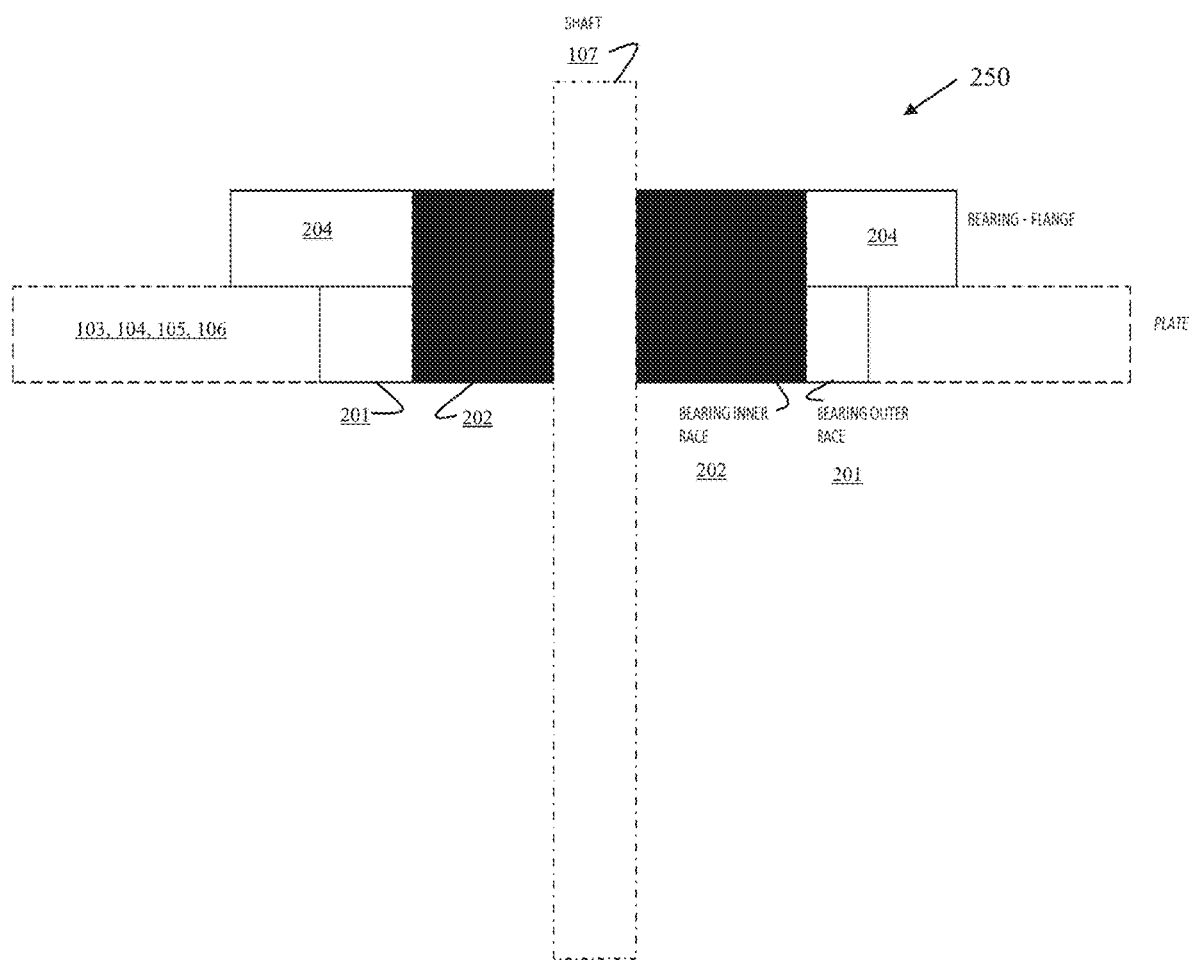
FIG. 2B is a side view of the threaded bearing integrated into a portion of a plate stability apparatus, according to an example embodiment.

FIG. 2B is a side view of the threaded bearing 200 integrated into a portion of a plate stability apparatus, according to an example embodiment. Shaft 107 fits through an aperture of both a corresponding plate (103, 104, 105, or 106) and the corresponding bearing aperture 203. The inner face 202 rotates clockwise and counterclockwise to move a corresponding plate (103, 104, 105, or 106) vertically downward or upward along the shaft 107. The outer race 201 does not rotate and remains fixed within an aperture of the corresponding plate (103, 104, 105, or 106) and is held firmly in place to the corresponding plate (103, 104, 105, or 106) via a bearing flange 204.

Figure 2C:
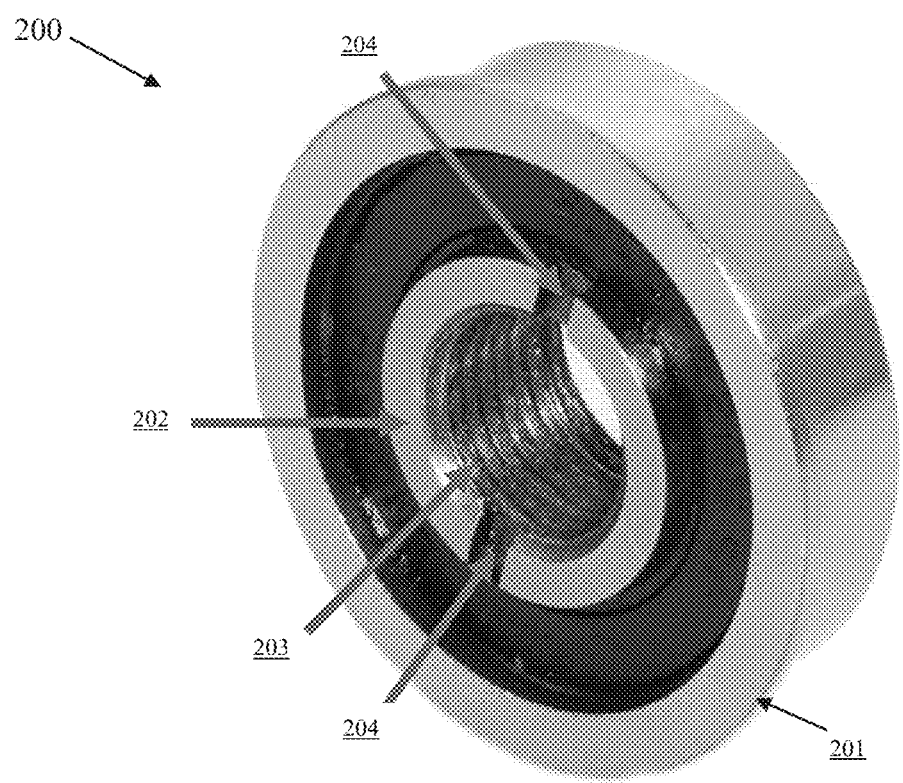
FIG. 2C is an image of the threaded bearing for a plate stability apparatus, according to an example embodiment.

FIG. 2C is an image of the threaded bearing 204 for a plate stability apparatus, according to an example embodiment. The bearing 204 includes an outer race 201, an inner race 202, a threaded aperture 203, and a flange 204. The flange 204 is adapted to snap or lock onto a corresponding plate (103, 104, 105, or 106) to prevent the corresponding plate (103, 104, 105, or 106) from slipping away from the bearing 204.

Figure 2D:
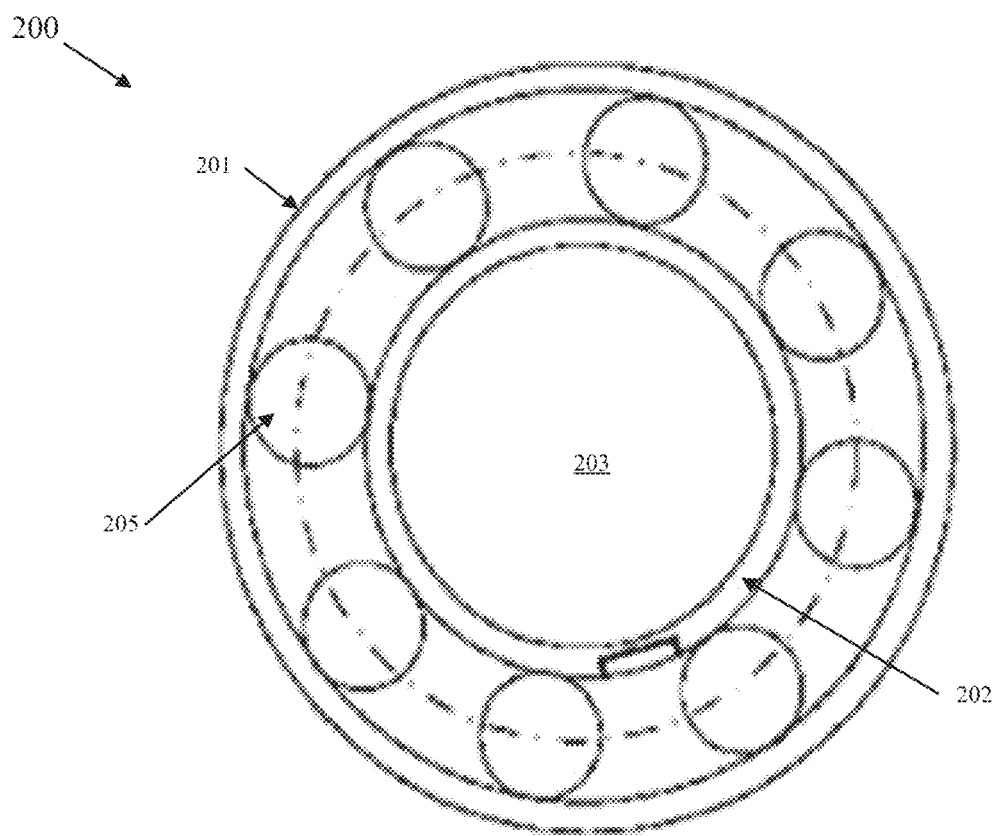
FIG. 2D is a diagram of internal bearings of the threaded bearing of FIG. 2A, according to an example embodiment.

FIG. 2D is a diagram of internal bearings of the threaded bearing 200 of FIG. 2A, according to an example embodiment. Bearing balls 205 permit the outer race 201 to remain stable and not rotate while the inner face 202 rotates inside of the outer race 201. This permits the bearings 200 to be stable and affixed to each of the plates (103, 104, 105, and 106) while the apertures 203 of the bearings rotate via the inner races 202 when screwed clockwise and counterclockwise along the shafts 107.

Figure 3A:
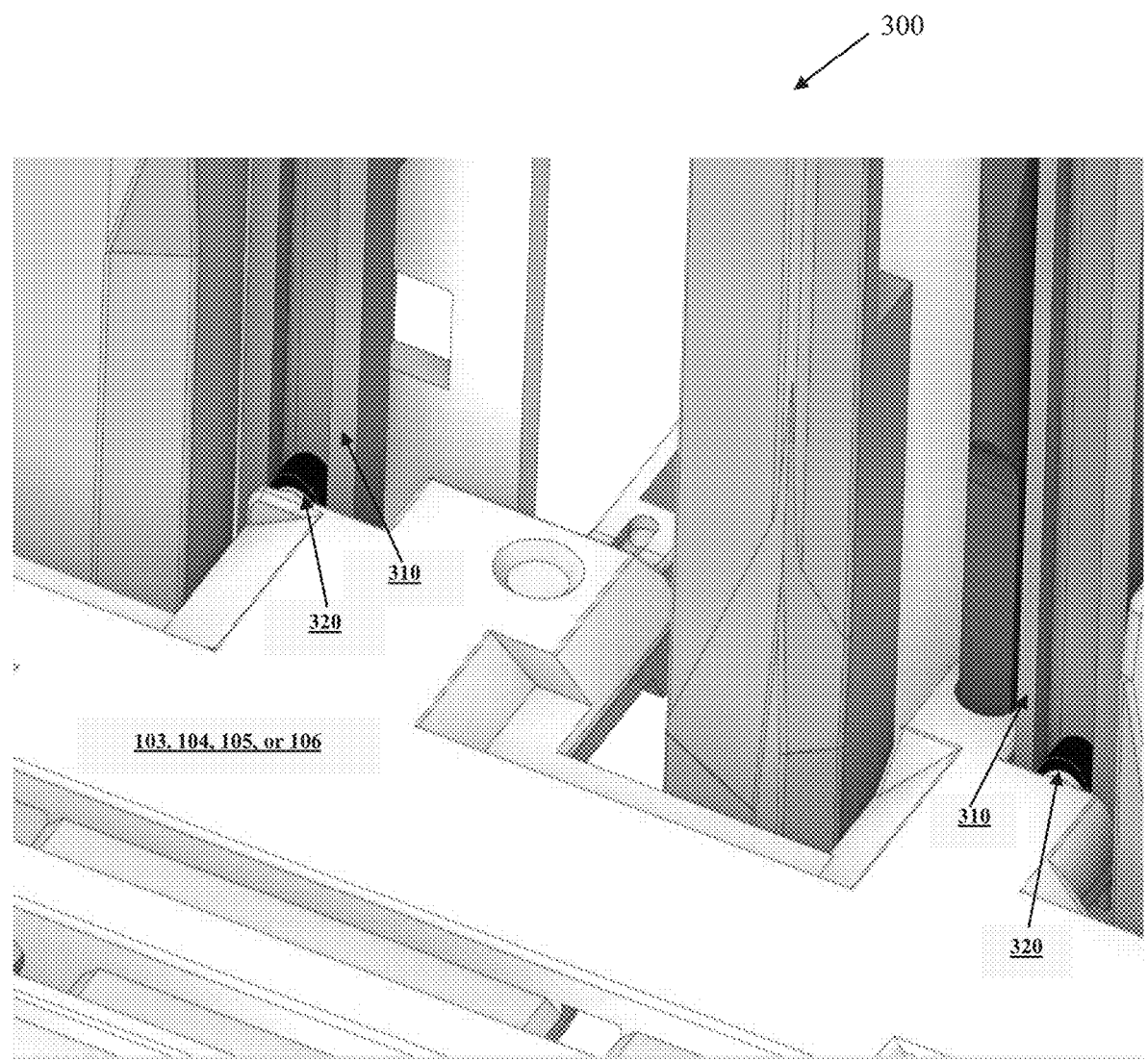
FIG. 3A is a diagram illustrating another plate stability apparatus, according to an example embodiment.

FIG. 3A is a diagram illustrating another plate stability apparatus, according to an example embodiment. The plate stability apparatus includes plates (103, 104, 105, and 106), rail shafts 310, and plate bearings 320. Each plate (103, 104, 105, and 106) includes four corner-based plate bearings that protrude out from corner edges of each plate (103, 104, 105, and 106). The plate bearings 320 are adapted to snuggly fit inside rail shafts 310.

Current approaches use a central rail mechanism with guides on two sides of existing plates. The plate stability apparatus of FIG. 3A includes four plate bearings 320 and four rail shafts 310 ("rails," rail shafts," and "vertical members" may be used synonymously and interchangeably herein), which provide increased stability and control of the plates (103, 104, 105, and 106), which conventionally is not achievable with conventional designs. The presented plate stability apparatus includes, with each plate (103, 104, 105, and 106), a front and rear plate bearing 320 on each of two sides of the corresponding plate (103, 104, 105, or 106). Each plate bearing 320 is adjacent to a corner of the corresponding plate (103, 104, 105, or 106).

The controller activates and controls movement of each plate (103, 104, 105, and 106) into the appropriate state position by urging the corresponding plates (103, 104, 105, and 106) upward and downward within the vertical rail shafts 310, the plate bearings 320 roll along inside sidewalls of the vertical rails shafts 310. In an embodiment, when a desired vertical position for a corresponding plate (103, 104, 105, or 106) is achieved, the controller locks rotation of the plate bearings 320 to prevent any tilting or tolerance in movement of the corresponding pate (103, 104, 105, or 106). In an embodiment, pressure exerted by the inside sidewalls of the vertical rail shafts 310 on sides of the plate bearings 320 lock the plate bearings 320 into the desired state position along the vertical rail shafts 310.

FIGS. 3B and 3B are diagrams illustrating rail guides 310 ("rail guides" may also be referred to as "vertical members" herein) and a clamp/brake and release within the rail guides 310 for a plate stability apparatus, according to an example embodiment. Each vertical rail guide 310 includes a clamp brake 311 for each plate (103, 104, 105, and 106). The clamp brake 311 lodges under a given plate (103, 104, 105, or 106) and surrounds the side walls of the corresponding vertical rail guide 310. The controller forces the clam brake 311 to exert force on the sidewalls of the vertical rail guide 310, clamping the sidewalls inward against the plate bearings 320 and locking the plates (103, 104, 105, and 106) in their desired state position along the vertical rail guide 310.

FIG. 3B illustrates locking the plate bearings 320 into position along a given rail guide 310. FIG. 3C illustrates unlocking of the plate bearings 320 to release the force of the sidewalls of the rail guides 310 and allowing the plate bearings 320 to be repositioned for the corresponding plates (103, 104, 105, and 106) vertically along the corresponding rail guides 310 to a different desired state position.

In an embodiment, clamp brakes 311 are affixed to underside corners of each plate (103, 104, 105, and 106) and adapted to fit around the outer sidewalls of the rail guides 310. In an embodiment, clamp brakes 311 are integrated into and surround the outer side walls of the rail guides 310.

Figure 4A:
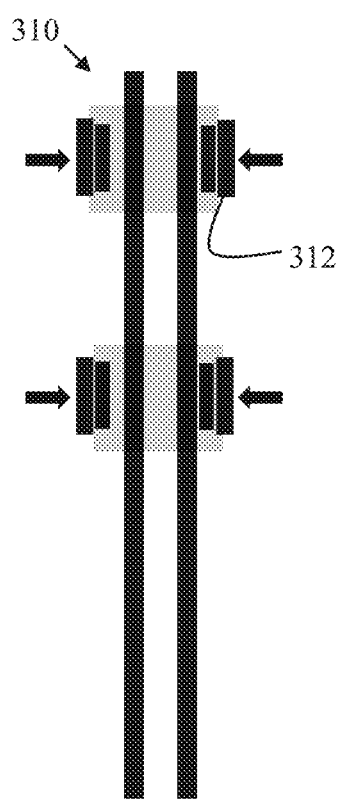
FIGS. 4A and 4B are diagrams illustrating rail guides and an electromagnetic stop and release for a plate stability apparatus, according to an example embodiment.
Figure 4B:
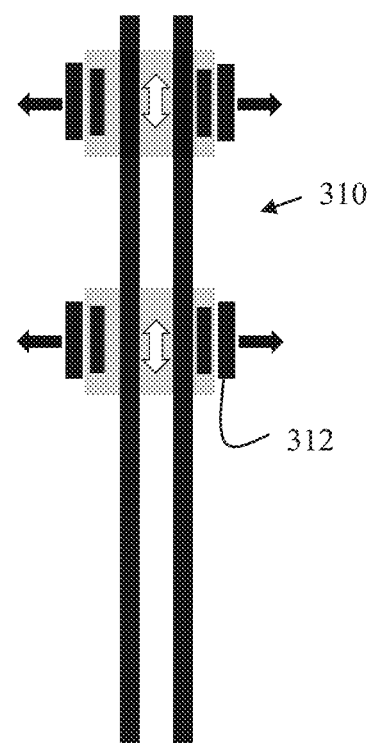

FIGS. 4A and 4B are diagrams illustrating rail guides and an electromagnetic stop and release for a plate stability apparatus, according to an example embodiment. Electromagnets 312 are integrated and surround sides walls of the vertical rail guides 310. A controller activates the electromagnets 312 when plates (103, 104, 105, and 106) reach a desired state vertical position along the rail guides 310. This causes metal-based plate bearings 320 of the plates (103, 104, 105, and 106) to be held and locked in place at the desired state positions. The locking of the plate bearings 320 is illustrated in FIG. 4A. A controller deactivates the electromagnets 312 when the plates (103, 104, 105, and 106) are being moved to a different state position along the vertical rail guide 310; this is illustrated in FIG. 4B.

In an embodiment, the electromagnets 312 are affixed to the underside corners of the plates (103, 104, 105, and 106). In an embodiment, the electromagnets 312 are movable along the side walls of the vertical rail guides 310.

Figure 5:
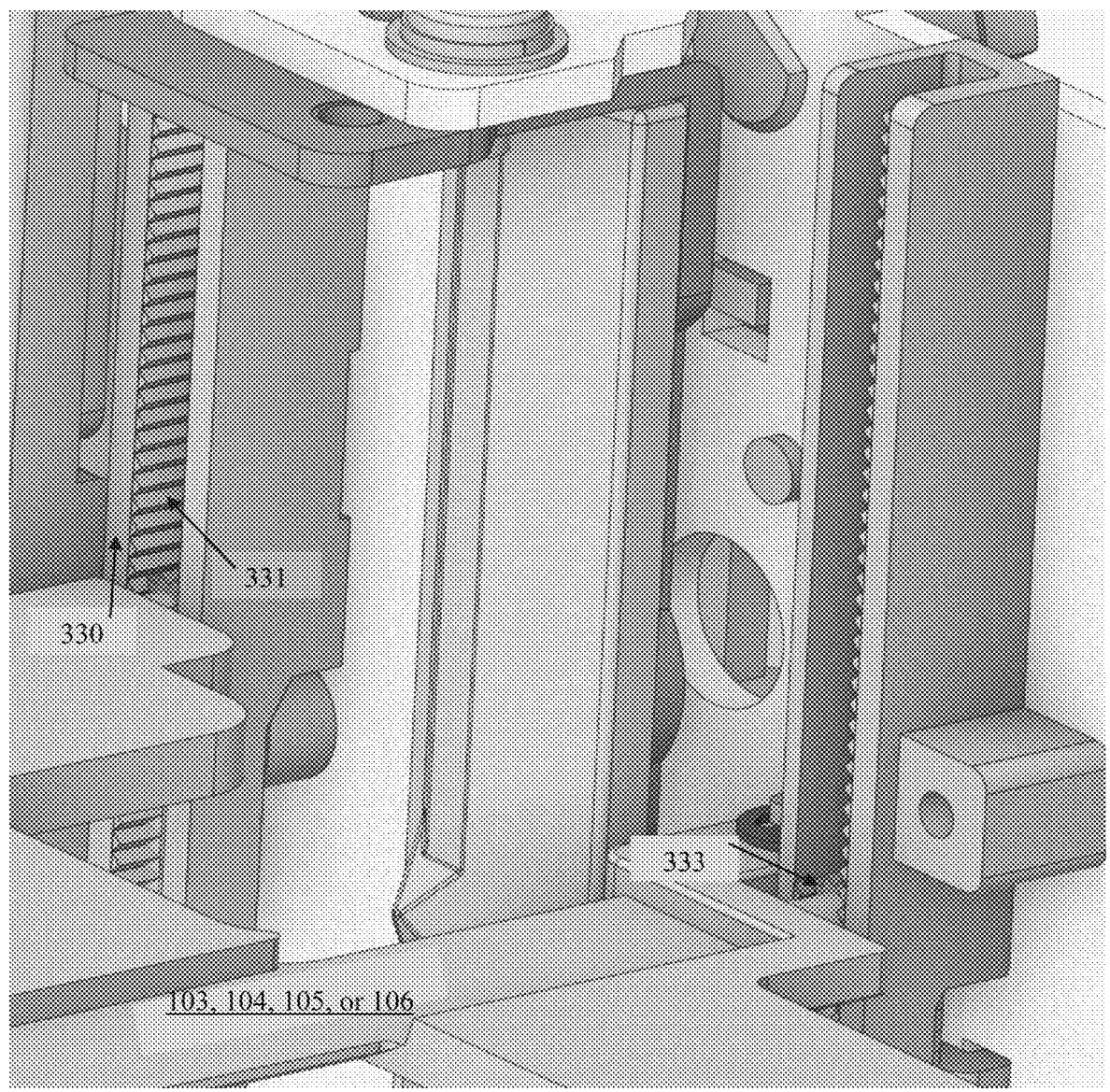
FIG. 5 is a diagram of yet another plate stability apparatus, according to an example embodiment.

FIG. 5 is a diagram of yet another plate stability apparatus, according to an example embodiment. The plate stability apparatus includes four plates (103, 104, 105, and 106), each plate (103, 104, 105, and 106) includes four corner adjacent geared elements 333 that rotate to lock into toothed or ribbed elements 331 of vertical guides 330.

The controller moves each plate (103, 104, 105, and 106) upward and downward to a desired vertical position along the vertical guides ("vertical guides" may be used interchangeably herein with "vertical members", "rails", and/or "rail shafts") 330, which causes the geared elements 333 to move through the tooth elements 331 of the vertical guides 330. When the controller reaches a desired vertical position for a given plate (103, 104, 105, and 106), the geared elements 333 lock into corresponding toothed elements 331 in the sidewalls of the corresponding vertical guides 330. This provides plate stabilization and locking to prevent tilting and movement tolerances in the plates (103, 104, 105, and 106).

Figure 6:
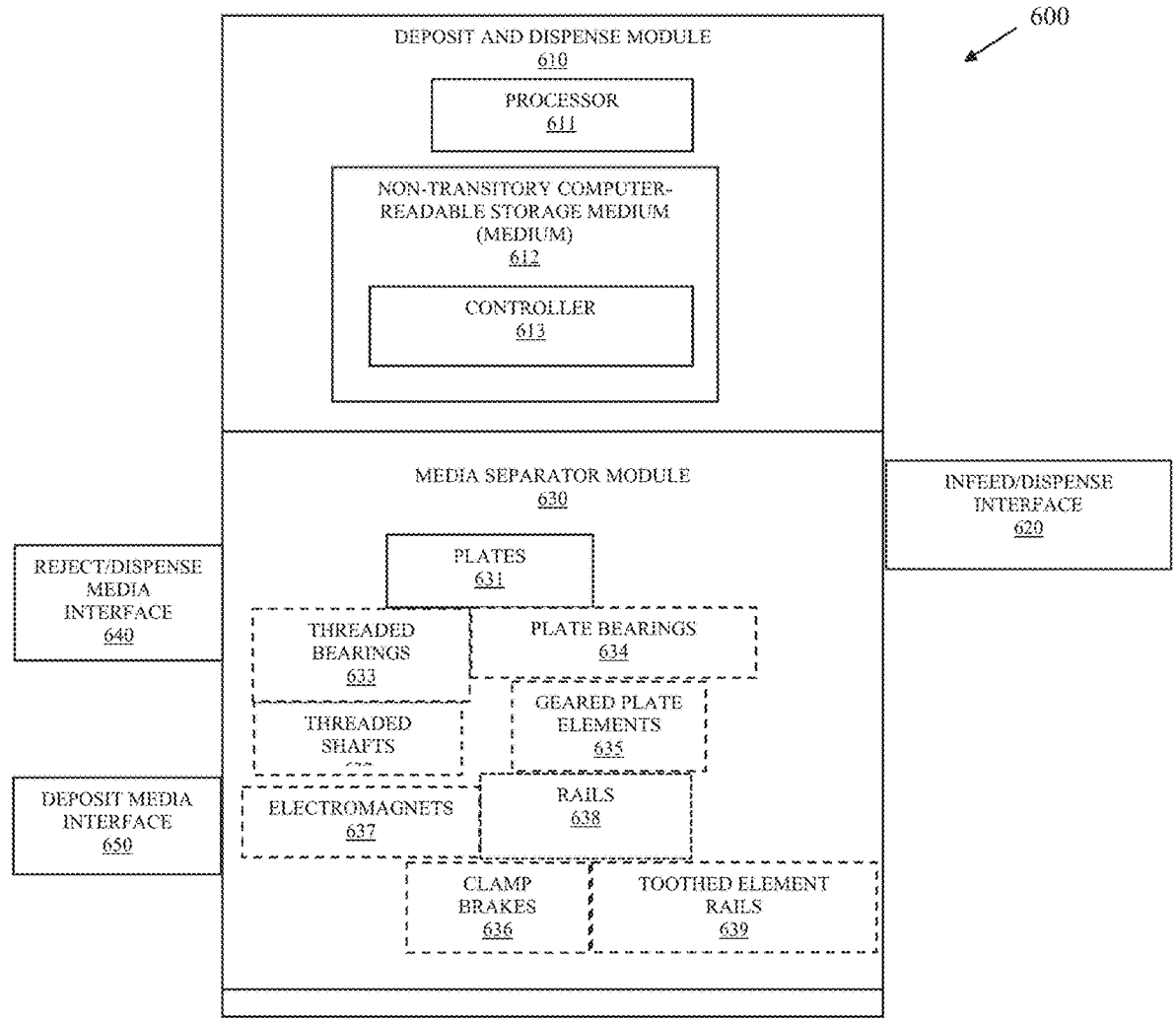
FIG. 6 is a diagram of a system that includes the plate stability apparatus, according to an example embodiment.

FIG. 6 is a diagram of a system 600 that includes the plate stability apparatus, according to an example embodiment. The components are shown schematically in simplified form, with only those components relevant to understanding of the embodiments being illustrated.

Furthermore, the various components illustrated in FIG. 1 and their arrangement are presented for purposes of illustration only. Other arrangements with more or less components are possible without departing from the teachings of plate stability for a deposit and dispense module and a media separator as presented herein.

System 600 includes a deposit and dispense module 610. The module includes a processor 611 and a non-transitory computer-readable storage medium, which includes executed instructions or firmware for a controller 613. When the processor 611 executes the instructions or firmware, this causes the processor 611 to perform the operations discussed herein with respect to controller 613.

Module 610 also includes an infeed/dispense interface 620, a deposit media interface 650, reject/dispense media interface 640, and a media separator module 630. The media separator module 630 includes plates 631. Optionally, the media separator module 630 includes threaded shafts 632 with threaded bearings 633; plate bearings 634, geared plate elements 635, vertical rails 638, rail clamp brakes 636, electromagnets 637, and/or toothed elements 639 integrated within the rails 638.

In an embodiment, the plate stability apparatus includes plates 631. Each plate 631 includes apertures adjacent to a corner of the corresponding plate 631 adapted to hold and attach to a threaded bearing 633. The plate stability apparatus further includes four threaded shafts 632 corresponding to four apertures adjacent to the four corners of each plate 613. Each threaded bearing 633 attached and affixed to the corresponding aperture of a corresponding corner of a corresponding plate 631. The threaded bearings 633 include threaded center apertures adapted to screw clockwise onto the threaded shafts 632 moving the plates downward along the shafts 632. The threaded bearings 633 are also adapted to unscrew counterclockwise along the threaded shafts moving the plates from an initial vertical position along the shafts 632 to an upward and higher vertical position along the shafts 632. In an embodiment, the plates 631 include the roof plate 103, the upper pusher plate 104, the lower pusher plate, and the stage plate 106. In an embodiment, the threaded shafts 632 are shafts 107. In an embodiment, the threaded bearings 633 are threaded bearings 200.

In an embodiment, the plate stability apparatus includes plates 631, plate bearings 634, and vertical rails 638. The plate bearings 634 extend adjacent to corners outward as appendages and each plate bearing 634 is adapted to fit snuggly with sidewalls of the rails 638, such that with force the bearings 634 roll to different vertical heights within the rails 638 and without force, the plates 634 remain level and stable in their current positions based on the force of the sidewalls of the rails 638 exerted on the bearings 634 to prevent the bearings 634 from moving or rolling. In an embodiment, the plates 631 include the roof plate 103, the upper pusher plate 104, the lower pusher plate, and the stage plate 106. In an embodiment, the rails 638 are the rails 310 and the plate bearings 634 are the plate bearings 320 as illustrated in FIG. 3A.

In an embodiment, the plate stability apparatus of the last reference embodiment further includes clamp breaks 636 that surround the sidewalls of the rails 638 for purposes of locking the plates 631 into a vertical position along the rails 638. In an embodiment, the clamp brakes are brakes 311 illustrated in FIGS. 3A and 3B.

In an embodiment, the plate stability apparatus of the penultimate embodiment further includes electromagnets 637 that magnetize against sidewalls of the rails 638 to metal plate bearings 634 for purposes of locking and unlocking the plates along vertical positions of the rails 638. In an embodiment, the electromagnets 637 are electromagnets 312 illustrated in FIGS. 4A and 4B.

In an embodiment, the plate stability apparatus includes plates 631 with geared plate elements 635. Each geared plate element 635 adjacent to one of four corners of a given plate 631. The plate stability apparatus further includes toothed element rails 639. Gears of each geared plate element 635 locks into a corresponding toothed element of the toothed element rails 639. In an embodiment, the toothed element rails 639 are the rails 330 having toothed elements 331 and the geared plate elements 635 are gear elements 333 as illustrated in FIG. 5.

The controller 613 controls the electromechanical components of the media separator module 630 for purpose of moving each plate 631 to a desired vertical position for a given media operation being processed for the deposit and dispense module 610. This includes moving the plates 631 using any of the discussed plate stability apparatuses.

Figure 7:
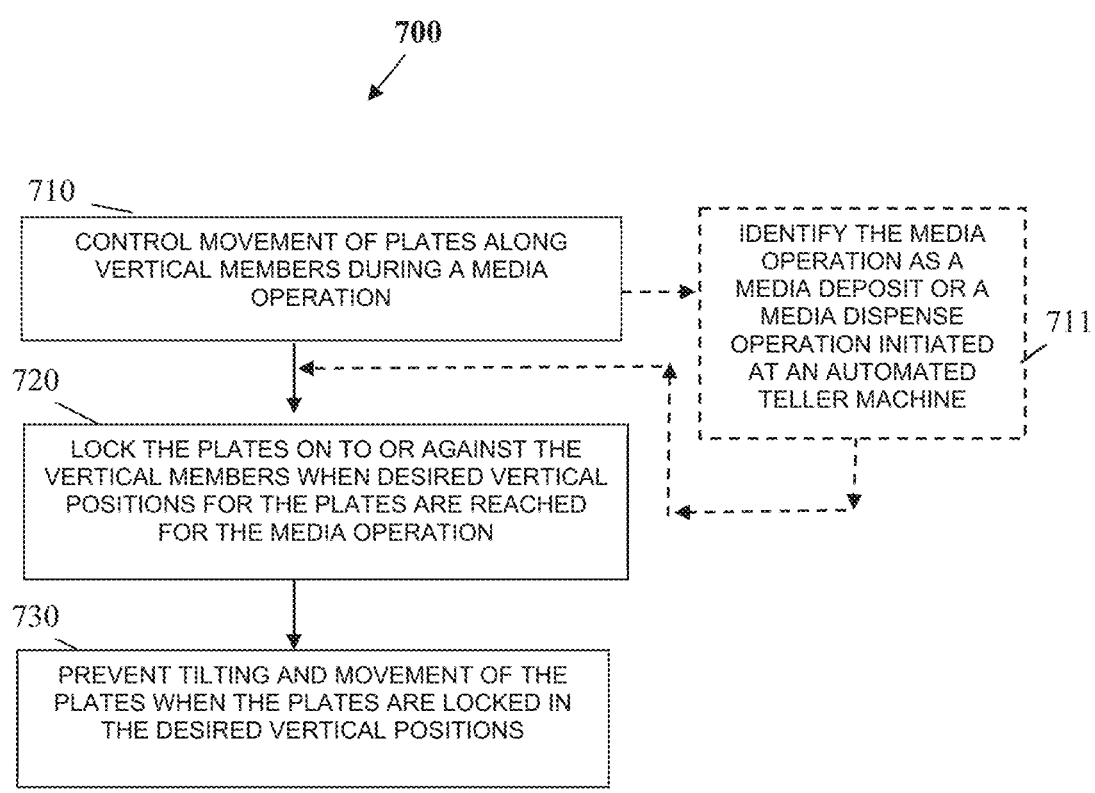
FIG. 7 is a diagram of a method for operating a plate stability apparatus during operations at a transaction terminal, according to an example embodiment.

FIG. 7 is a diagram of a method 700 for operating a plate stability apparatus during operations at a transaction terminal, according to an example embodiment. The software module(s) that implements the method 300 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may or may not have access to one or more network connections during its processing. Any network connections used are wired, wireless, or a combination of wired and wireless.

In an embodiment, the device that executes the firmware is the deposit and dispense module 100 and/or 610. In an embodiment, the firmware is the controller 613 or the controller discussed above in the FIGS. 1A-1D, 2A-2D, 3A-3C, 4A-4B, and 5.

At 710, the firmware controls movement of plates along vertical members during a media operation. In an embodiment, at 711, the firmware identifies the media operation as a media deposit, or a media dispense operation initiated at an ATM. In an embodiment, the media operation causes the firmware to identify desired states that are needed, each state associated with given vertical positions of the plates along the vertical members. In an embodiment, one state is a rejected media state associated with a media deposit.

At 720, the firmware locks the plates on to or against the vertical members when desired vertical positions for the plates are reached for the media operation. At 730, the firmware prevents tilting and movement of the plates when the plates are locked in the desired vertical positions.

The above description is illustrative, and not restrictive. Other embodiments will be apparent to those of skill in the art upon reviewing the above description. The scope of embodiments should therefore be determined with reference to the appended claims, along with the full scope of equivalents to which such claims are entitled.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

The above description is illustrative, and not restrictive. Other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A plate stability apparatus for a media separator, comprising:
    plates to handle media for a media operation;
    vertical members on which corners of the plates are interfaced to move each plate up or down the vertical members to a vertical position for the media operation;
    wherein once a given plate reaches a corresponding vertical position along the vertical members, the corners of the plates are locked into place to prevent tilting and movement of the given plate;
    wherein the vertical members are rails with sidewalls, and wherein each plate includes a plate bearing extending adjacent to a corresponding corner of a corresponding plate and attached to the corresponding plate, each plate bearing fits snuggly inside corresponding sidewalls of a corresponding rail;
    wherein the sidewalls pinch against plate bearings locking each plate bearing in place at the corresponding vertical position for the media operation.

2. The plate stability apparatus of claim 1 further comprising:
    threaded bearings, each threaded bearing affixed to a corresponding plate adjacent to a corresponding corner;
    wherein the vertical members include threaded shafts that screw and unscrew through threaded apertures of the threaded bearings to move the plates to the vertical position.

3. The plate stability apparatus of claim 2, wherein each threaded bearing includes an outer race and an inner race, the outer race does not rotate, and the inner race rotates permitting a corresponding threaded bearing to be screwed and unscrewed onto a corresponding threaded shaft.

4. The plate stability apparatus of claim 1, wherein the sidewalls include clamp brakes situated along the rails to lock and unlock the plate bearings.

5. The plate stability apparatus of claim 1, wherein sidewalls include electromagnets situated along the rails that activate and deactivate to lock and unlock the plate bearings, wherein the plate bearings are metal-based plate bearings.

6. The plate stability apparatus of claim 1, wherein the sidewalls include toothed elements situated along the sidewalls of the rails, and wherein each plate includes a plate geared element extending adjacent to a corresponding corner of the corresponding plate and attached to the corresponding plate, each plate geared element locks into corresponding toothed elements of the sidewalls of a corresponding rail, wherein each plate geared element is adapted to vertically rotate to move up and down the rails.

7. The plate stability apparatus of claim 6, wherein the media separator is integrated within or interfaced to a deposit and dispense module.

8. The plate stability apparatus of claim 7, wherein the deposit and dispense module is integrated within or interface to a transaction terminal.

9. A media separator, comprising:
a plate stability apparatus to control vertical positions of horizontal plates along vertical members of the media separator during a media operation to transport media within a deposit and dispense module;
wherein the plate stability apparatus locks, unlocks, and moves one or more of the horizontal plates along the vertical members during the media operation;
wherein the vertical members are rails with sidewalls to receive plate bearings between the sidewalls;
wherein sidewalls include electromagnets and wherein the plate bearings are metal plate bearings.

10. The media separator of claim 9, wherein the vertical members include threaded shafts to screw and unscrew within threaded apertures or threaded bearings associated with the horizontal plates.

11. The media separator of claim 9, wherein sidewalls include electromagnets and wherein the plate bearings are metal plate bearings.

12. The media separator of claim 9, wherein the sidewalls include toothed elements interfaced to plate geared elements.

13. The media separator of claim 9, wherein the plate stability apparatus maintains each horizontal plate level during vertical movement of a corresponding horizontal plate along the vertical members.

14. The media separator of claim 9, wherein the deposit and dispense module is interfaced to an automated teller machine that initiated the media operation.

15. A method of operating a media separator, comprising:
controlling movement of plates along vertical members during a media operation;
locking the plates on to or against the vertical members when desired vertical positions for the plates are reached for the media operation;
preventing tilting and movements of the plates when the plates are locked in the desired vertical positions; and
identifying the media operation as a media deposit or a media dispense operation initiated at an automated teller machine.

* * * * *